Figure 1:
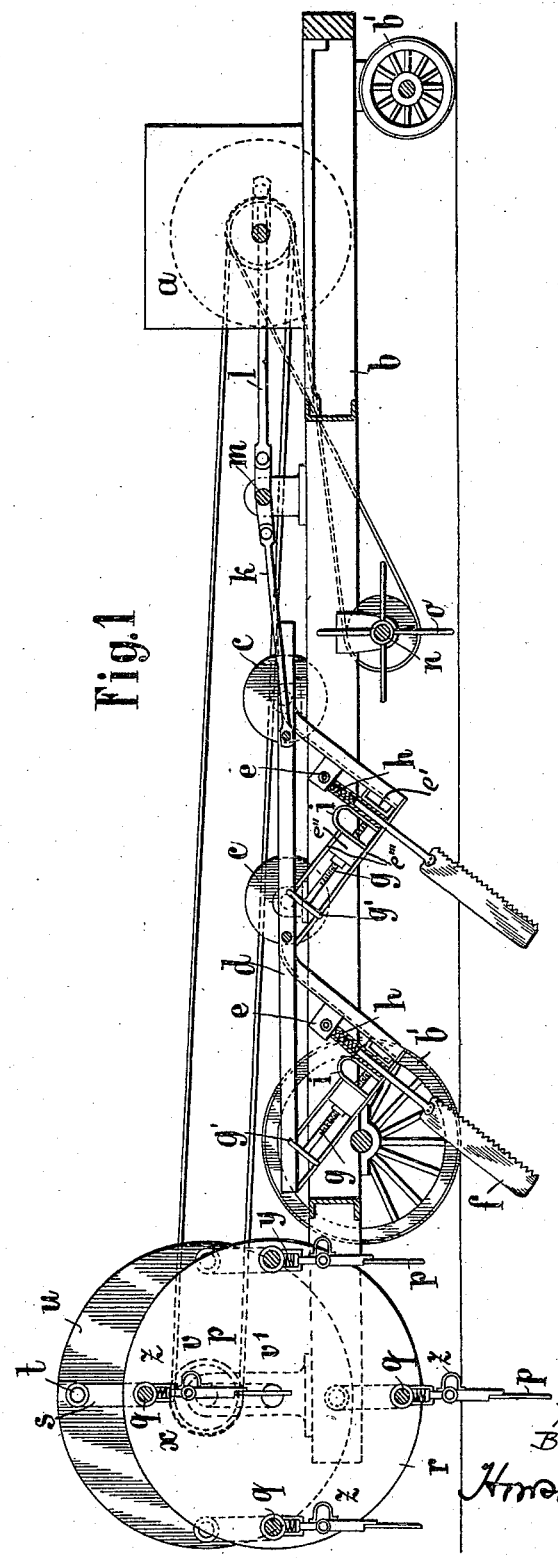

H. KERRINNES.
MACHINE FOR TILLING THE GROUND.
APPLICATION FILED FEB. 7, 1911.

987,577.

Patented Mar. 21, 1911.

4 SHEETS—SHEET 1.

H. KERRINNES.
MACHINE FOR TILLING THE GROUND.
APPLICATION FILED FEB. 7, 1911.

987,577.

Patented Mar. 21, 1911.
4 SHEETS—SHEET 2.

WITNESSES

INVENTOR
Heinrich Kerrinnes
BY
his ATTORNEYS

H. KERRINNES.
MACHINE FOR TILLING THE GROUND.
APPLICATION FILED FEB. 7, 1911.

987,577.

Patented Mar. 21, 1911.
4 SHEETS—SHEET 3.

WITNESSES
L. H. Grote
M. E. Kir

INVENTOR
Heinrich Kerrinnes
BY
Howson and Howson
his ATTORNEYS

THE NORRIS PETERS CO., WASHINGTON, D. C.

H. KERRINNES.
MACHINE FOR TILLING THE GROUND.
APPLICATION FILED FEB. 7, 1911.
987,577.
Patented Mar. 21, 1911.
4 SHEETS—SHEET 4.
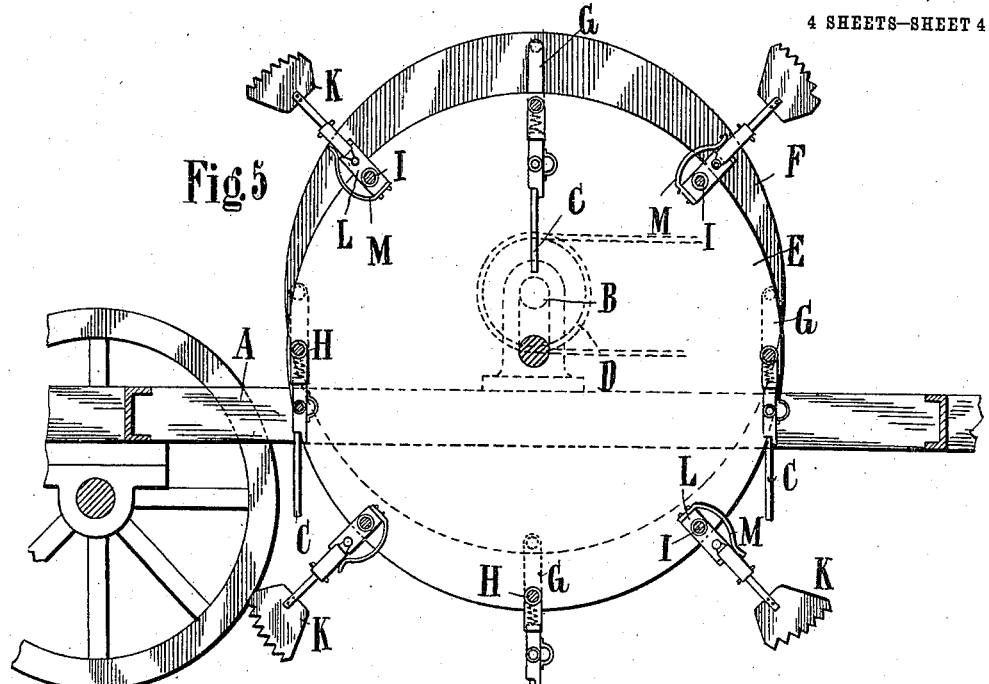
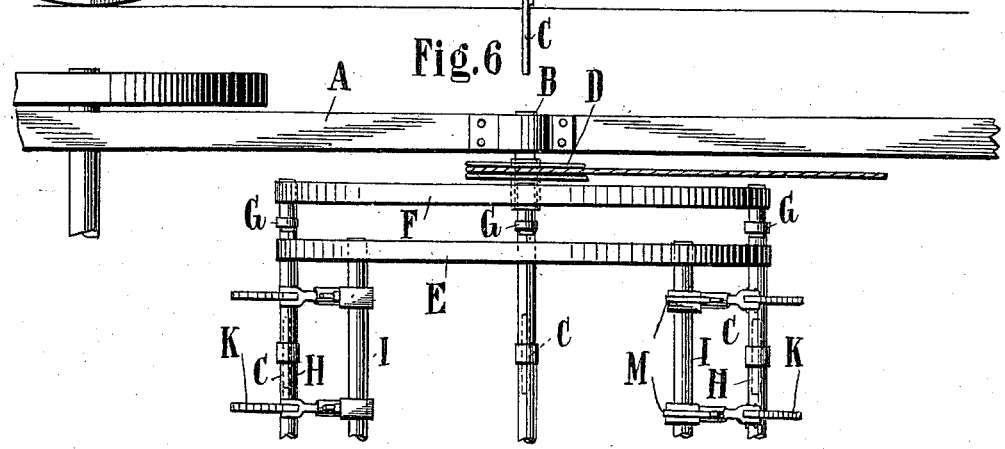
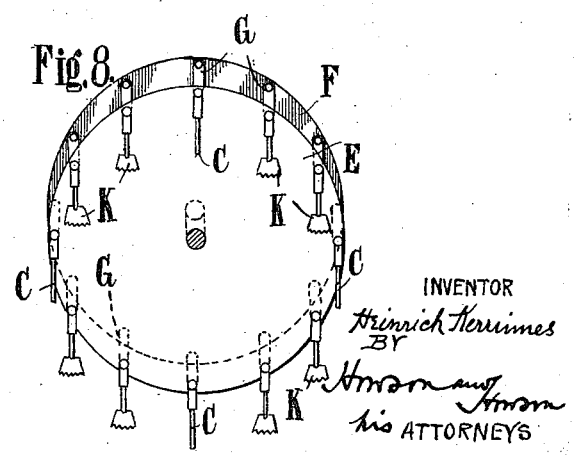

UNITED STATES PATENT OFFICE.

HEINRICH KERRINNES, OF DOM. RAMBERG, NEAR GROSS SOBROST, GERMANY.

MACHINE FOR TILLING THE GROUND.

987,577.  Specification of Letters Patent.  Patented Mar. 21, 1911.

Application filed February 7, 1911. Serial No. 607,067.

*To all whom it may concern:*

Be it known that I, HEINRICH KERRINNES, a subject of the King of Prussia, residing at Dom. Ramberg, near Gross Sobrost, Germany, have invented certain new and useful Improvements in Machines for Tilling the Ground; and I do hereby declare the following to be a full, clear, and exact description of the invention.

My invention relates to machines for tilling the ground.

The mode of plowing known heretofore placed very great demands on the tractive power of the animals and of the motor. Considerable resistance was caused owing to pressure and great friction on the faces of the body of the plow by the cutting, slicing and turning of the ground.

A primary object of my invention is to obviate this resistance as much as possible by avoiding the frictional contact of the ground with the entire face of the body of the plow, thereby diminishing very considerably the power required and the weight of the implement. I attain this end according to my invention by a suitable arrangement of saws and spades. Also, when tilling the ground by plows in the manner known heretofore the ground is turned over in such manner that the surface soil is placed below, whereby the bacteria which flourish better in the surface soil and promote the growth of the plants are for the most part killed. For many purposes it is therefore preferable when only the surface soil is turned and broken up.

According to my invention, the ground is cut up by means of flexibly mounted adjustable slanting saws and is then broken up still more, mixed or thrown to the rear by means of vertically guided, likewise flexibly mounted spades.

In order to cut up the ground as well as possible the saws which are flexibly mounted by means of springs both in the vertical direction and in the direction of travel have imparted to them a rocking motion owing to their being mounted in frames connected with a crank-shaft driven by the motor. The spades which break up the ground still more and which, in order to work up the entire area, are arranged transversely of the saws are guided vertically owing to their being attached to rods which not only pass through lateral disks, but are connected by fixedly mounted cranks with disks or arms driven by the motor.

Sometimes, having regard to the season of the year and as is also frequently necessary for other purposes, only the surface soil must be cut up, but this cannot be accomplished by oscillating saws. Circular saws have the latter advantage. But in the case of these circular saws enabling shallow working the defect is met with that, when each saw is not driven and mounted independently, all the saws are always simultaneously lifted and affected on account of stones and the like in the ground. Also, when a large number of saws are arranged in a row one beside another it is difficult to provide a suitable elastic guide meeting the conditions in question.

Another object of my invention is to remedy these defects.

Instead of the circular saws known in themselves I may employ segment-shaped saws which are not only adjustable, owing to springs, in the direction of travel and, if necessary, are mounted flexibly in the perpendicular direction, but are arranged on revoluble frames and, owing to the coöperation with the spade device, have in addition the advantage of less friction in the ground. To this end, I preferably use the frames for the spades which work the ground additionally and move transversely to the direction of travel. Owing to each segment-shaped saw being made flexible, without affecting the other saws each saw can avoid the stones or the like in the ground.

Several illustrative embodiments of my invention are represented by way of example in the accompanying drawing.

Figure 2:
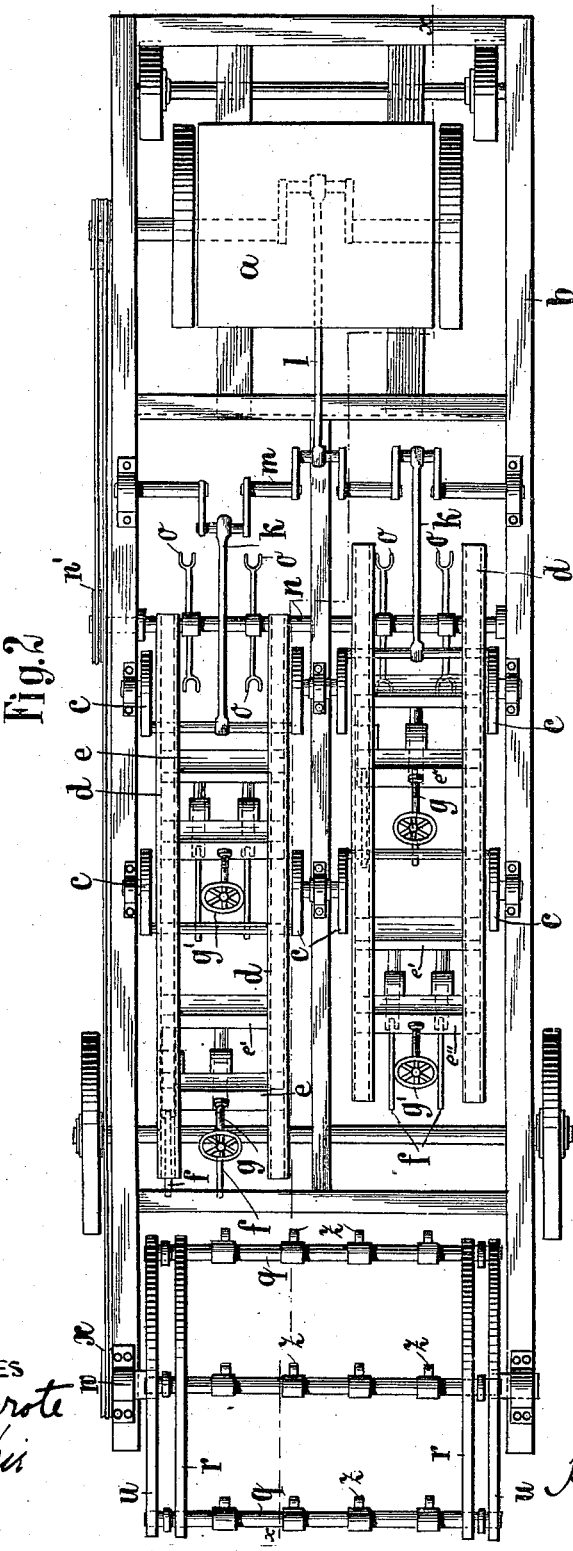
Figure 3:
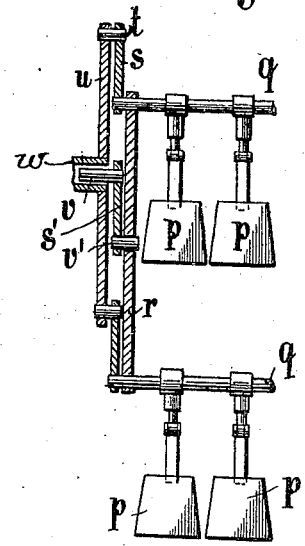
Figure 4:
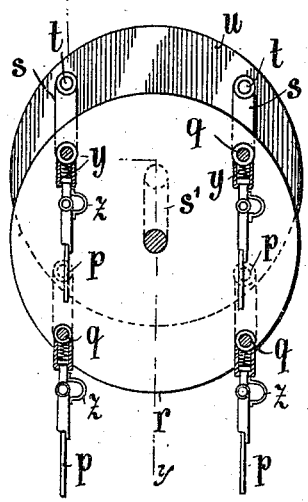

One form of my invention intended for turning up the ground is represented in Figures 1 to 4 inclusive, wherein Fig. 1 is a longitudinal sectional view on the line *x—x* of Fig. 2. Fig. 2 is a plan view. Fig. 3 is a sectional view of one of the disks and connected parts, on the line *y—y* of Fig. 4. Fig. 4 illustrates another position of the individual parts. Another form of my invention is shown in Figs. 5 to 8 inclusive, in which the saws are mounted in the frame for the spades. Fig. 5 is a side elevation of Fig. 6. Fig. 6 is a plan view of Fig. 5. Fig. 7 shows details of a modified saw on an enlarged scale. Fig. 8 is a diagrammatic side elevation of another form of the invention.

Referring firstly to Figs. 1 to 4, two frames *d* are mounted in oscillating disks *c* on a carriage *b* carrying a motor *a*. The saws *f* are arranged relatively to one another in supports or frames *e* in the former frames. Each of these saws can be adjusted slantwise to the ground by means of a screw *g* mounted in the cross beam, *e'* and passing through other cross beams, *e''* to which the saws are connected whereby when the screw is turned the cross beam *e''* is moved in an appropriate guide, *e'''*, to raise or lower the saw and thereby change the slant of the same, said screw being provided with a handle *g'*. Each saw is pressed from above by a coiled spring *h* and in the direction of travel by a leaf-spring *i* in order that the saws may avoid any stones in the ground when at work and be prevented from being fractured. The frames *d* are connected by rods *k* with a crank-shaft *m* driven through the medium of the rod *l* by the motor *a*. Owing to the frames *d* being connected with the crank-shaft *m* on the one hand and to their being eccentrically mounted in the disks *c* on the other hand, when the motor is working the frames *d* and the saws mounted therein have imparted to them a rocking motion causing the saws to travel through the ground and cut it up.

Preferably, forks *o* are arranged in front of the saw-blades on an axle *n* mounted on the carriage *b*, and these forks bring any manure on the land in front of the saws in order that it may be cut up by the latter. The axle *n* of the forks is rotated through the medium of a sprocket wheel *n'* or the like by the motor in a direction opposite to the direction of rotation of the wheels *b'* of the carriage *b*.

Spades *p*, which work the ground additionally, are arranged behind the saws *f* and transversely thereof. In order that these spades may always be inserted vertically into the ground they are mounted to rotate about rods *q* guided loosely in two disks *r* located laterally of the spades *p*. As shown in Fig. 3, on the ends of these rods *q* I fix crank-arms *s*, whose pins are revoluble in the disks *u*. The central crank-arm *s'* is loosely guided by its pins *v* and *v'* on the one hand in the hollow driving shaft *w* of the disk *u* and on the other hand in the disk *r*. The axle *w* is driven through the medium of a sprocket wheel *x* by the motor (Fig. 2). The individual spades *p* are flexibly mounted by means of coiled springs *y* and leaf springs *z* in similar manner as the saws. Owing to these spades being driven at a speed greater than the speed of travel of the carriage, the spades introduced vertically into the ground with little friction split the ground, go slantwise downwardly and upwardly, break up the ground, mix it or throw it to the rear.

Owing to the arrangement of the vertically guided spades rotating eccentrically relatively to the disks which drive them, as compared with tilling machines working in a train known heretofore, in which the operative tilling members rotate radially, I obtain the advantage that the friction at the rear wall of the spade which, when the operative tilling members rotate radially is very great in consequence of the forward motion of the motor car, is almost completely done away with. The elevating and throwing of the earth which requires considerable power when the operative tilling members rotate radially is likewise avoided in my new arrangement of the spades.

Not only the mode in which the spades are guided vertically, but also both the slanting arrangement of the saws and the number of these tools may, of course, be varied as desired.

In the illustrative embodiment of my invention represented in Figs. 5 to 8, the frame for the spades C which can be rotated by means of the sprocket wheel D is journaled in known manner by means of the journals B in the carriage A of the tilling machine. The inside disks E of the frame which are eccentrically driven by the cranks G revoluble in the outer disks F are connected together both by the rods H which carry the spades C and are guided loosely in the disks E, and by fixedly mounted rods I. To these rods I arranged in a circle are revolubly attached by means of a plate L the segment-shaped saws K which cut up the ground. (Fig. 7.) Each saw K is pressed in the line of travel by a leaf spring M attached to the rod I and from above by a coiled spring P which is arranged in the socket N and acts on the shank O of the saw. Owing to the pin R sliding in the slot Q (Fig. 7) in the socket N the saw is prevented from rotating and its upward movement is simultaneously limited, while the lug or stop S provided on the plate L limits the motion in the line of travel.

The number of segment-shaped saws and the mode of their attachment to their revoluble frame may of course be varied as desired.

The ground cut up by the saws is broken up still more or thrown to the rear, in the manner described above with reference to Figs. 1 to 4, by means of the spades C which are movable transversely of the direction of travel of the carriage A and are driven vertically by the crank-arms G. The saws K can also be driven vertically in similar manner as the spades C by employing additional cranks G rotatable in the outer disks F, in which event (see Fig. 8) two or more saws K can be arranged between each two spades C.

The arrangement of the saws in advance of the spades enables said saws to cut parallel rows of kerfs or channels in the ground to thereby better prepare the ground for the succeeding action of the spades, which latter operate on the ground between the rows of parallel kerfs and separate or break up the ground along the lines prepared by the saws, thereby materially reducing the strain on the blades necessary to entirely detach the clods or broken pieces of the ground.

I claim:

1. In a machine of the character described, the combination, with a carriage and a motor thereon, of a plurality of normally slanting saws flexibly and adjustably mounted to move on the carriage, a plurality of substantially vertically guided, downwardly spring-pressed spades mounted to move on the carriage, and means driven by the motor for driving the saws and the spades.

2. In a machine of the character described, the combination, with a carriage and a motor thereon, of a plurality of normally slanting saws flexibly and adjustably mounted to move on the carriage, a plurality of substantially vertically guided, downwardly spring-pressed spades mounted to move on the carriage, and means driven by the motor for driving the saws and the spades, the blades of the spades being arranged transversely of the blades of the saws.

3. In a machine of the character described, the combination, with a carriage and a motor thereon, two outer disks journaled in the carriage one at each side thereof, means driven by the motor driving the disks, two inner disks eccentric with the outer disks, cranks operatively connecting the outer disks with the inner disks, rods fixedly connected with the inner disks, saws mounted on the rods, rods loosely connected with the inner disks, and vertically guided, downwardly spring-pressed spades mounted on the latter rods.

4. In a machine of the character described, the combination, with a carriage and a motor thereon, of two outer disks journaled in the carriage one at each side thereof, means driven by the motor driving the disks, two inner disks eccentric with the outer disks, cranks operatively connecting the outer disks with the inner disks, rods fixedly connected with the inner disks, segment-shaped saws mounted radially relatively to the inner disks on the rods, rods loosely connected with the inner disks, and vertically guided, downwardly spring-pressed spades mounted on the latter rods.

5. In a machine of the character described, the combination, with a carriage and a motor thereon, of two outer disks journaled in the carriage one at each side thereof, means driven by the motor driving the disks, two inner disks eccentric with the outer disks, cranks operatively connecting the outer disks with the inner disks, rods fixedly connected with the inner disks, segment-shaped saws elastically mounted radially relatively to the inner disks on the rods, rods loosely connected with the inner disks, and vertically guided, downwardly spring-pressed spades mounted on the latter rods.

In testimony that I claim the foregoing as my invention, I have signed my name in presence of two subscribing witnesses.

HEINRICH KERRINNES.

Witnesses:
ADOLF MACEDOT,
WILH. FRISCHGESCH.

---

Copies of this patent may be obtained for five cents each, by addressing the "Commissioner of Patents, Washington, D. C."